United States Patent [19]

Melk

[11] Patent Number: 6,062,434
[45] Date of Patent: *May 16, 2000

[54] INSULATED JACKET AND CONTAINER ASSEMBLY

[75] Inventor: Thomas J. Melk, Chicago, Ill.

[73] Assignee: Outer Circle Products, Ltd., Chicago, Ill.

[*] Notice: This patent is subject to a terminal disclaimer.

[21] Appl. No.: 09/173,777

[22] Filed: Oct. 16, 1998

Related U.S. Application Data

[63] Continuation of application No. 08/801,626, Feb. 18, 1997, Pat. No. 5,848,734.

[51] Int. Cl.[7] ........................................... B67D 5/64
[52] U.S. Cl. ........................ 222/175; 222/183; 383/80; 383/110; 224/148.3
[58] Field of Search ......................... 222/175, 183, 222/465.1, 534; 383/110, 60, 16, 121.1, 123; 224/148.3, 148.6, 148.5; 62/457.4

[56] References Cited

U.S. PATENT DOCUMENTS

| | | |
|---|---|---|
| D. 247,392 | 2/1978 | Coleman . |
| D. 315,848 | 4/1991 | Guzman . |
| D. 357,845 | 5/1995 | Herszenberg . |
| 1,949,677 | 3/1934 | Crawford . |
| 2,376,194 | 5/1945 | Samuels . |
| 3,206,083 | 9/1965 | Nishina . |
| 4,197,890 | 4/1980 | Simko . |
| 4,463,789 | 8/1984 | Leiserson . |
| 4,513,895 | 4/1985 | Leslie . |
| 4,802,602 | 2/1989 | Evans et al. . |
| 4,812,054 | 3/1989 | Kirkendall . |
| 4,826,060 | 5/1989 | Hollingsworth . |
| 4,860,927 | 8/1989 | Grinde . |
| 4,871,597 | 10/1989 | Hobson . |
| 5,392,968 | 2/1995 | Dark . |
| 5,848,734 | 12/1998 | Melk ........................................ 222/183 |

OTHER PUBLICATIONS

Product Identification Label for Prince Cooler Touring Pro Collection, 3 pages, no date identified, known to Applicant approximately Apr. 1996.
Photo Sheet 1, Photo 1—Photo 5, as described in the Information Disclosure Statement, of four products: (1) Aqua Sack; (2) Aqua Sack; (3) Outdoor Products; and (4) Insulated Bottle Tote, no date.
Photo Sheets 2 and 3, Photo 6—Photo 9 —four (4) photographs of the product shown in Photo 1, no date.
Photo Sheet 4, a color copy image of an Aqua Sack tag, no date.
Page 1, Aqua Sack product hang tag, copyright 1995.
Page 2, Aqua Sack hang tag, copyright 1995.
Page 3, H$_2$O to Go, Outdoor Products, no copyright date.
Page 4, Insulated Bottle Tote hang tag, United World Products, Inc, no date.

*Primary Examiner*—Philippe Derakshani
*Attorney, Agent, or Firm*—McDonnell Boehnen Hulbert & Berghoff

[57] ABSTRACT

An insulated container assembly which includes an insulated jacket and a container liner retained in the jacket. The container liner is formed having a body defining a mouth at an upper end thereof. A cap is retained on the container liner over the mouth. The insulated jacket has at least one wall which defines a cavity therein for receiving the container liner. A hood portion of the insulated jacket is attached to and extends from a portion of the wall. A closure structure is provided on the hood and the wall. The container liner is generally rigid and the insulated jacket is a generally flexible construction. The container liner can be loaded from the top into the cavity of the insulated jacket. The hood is extended over the cap with the cap extending through a cap opening in the hood defined by a collar thereof. The closure structure is operated to secure the hood to the wall of the insulated jacket and retain the container liner in the cavity thereof.

20 Claims, 8 Drawing Sheets

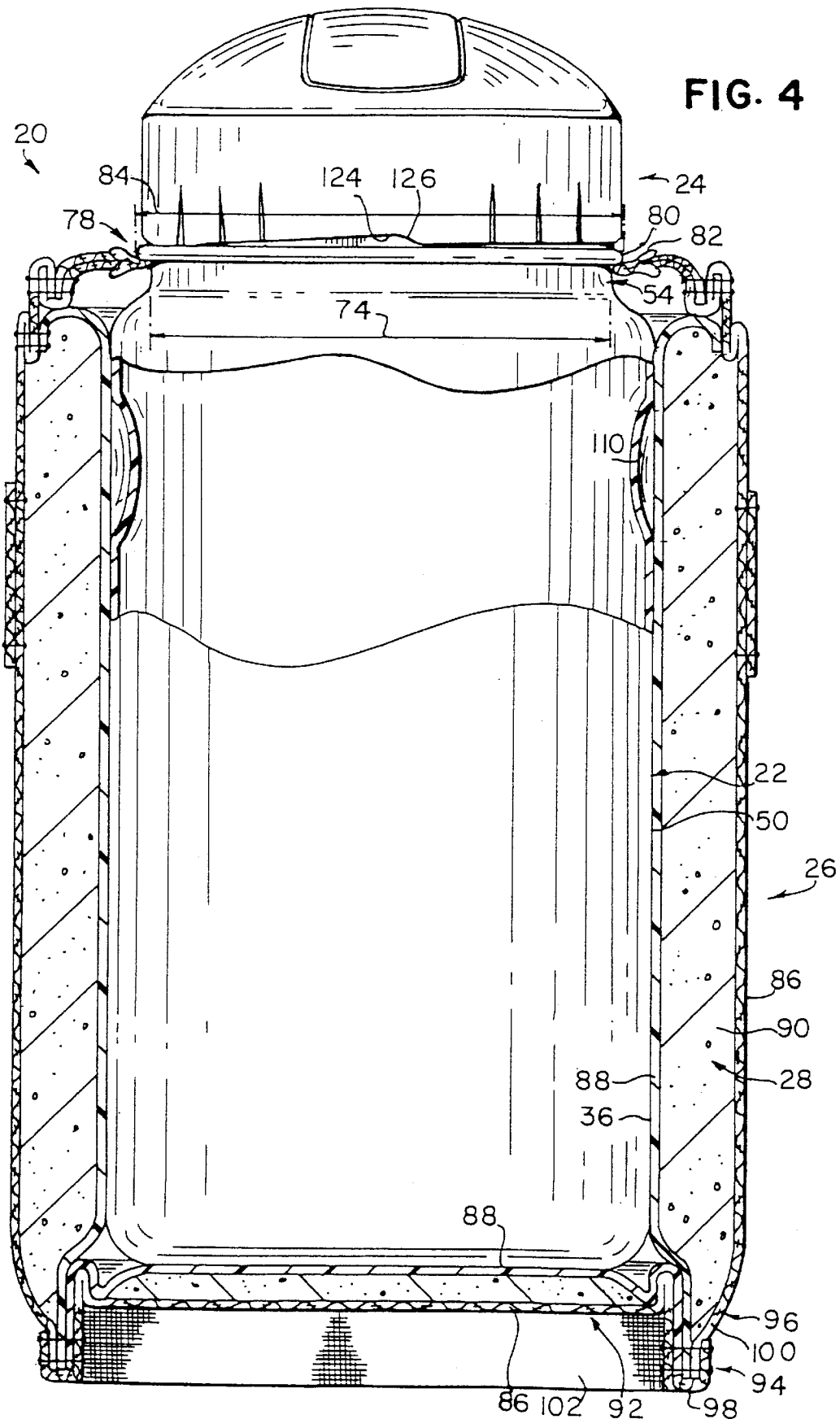

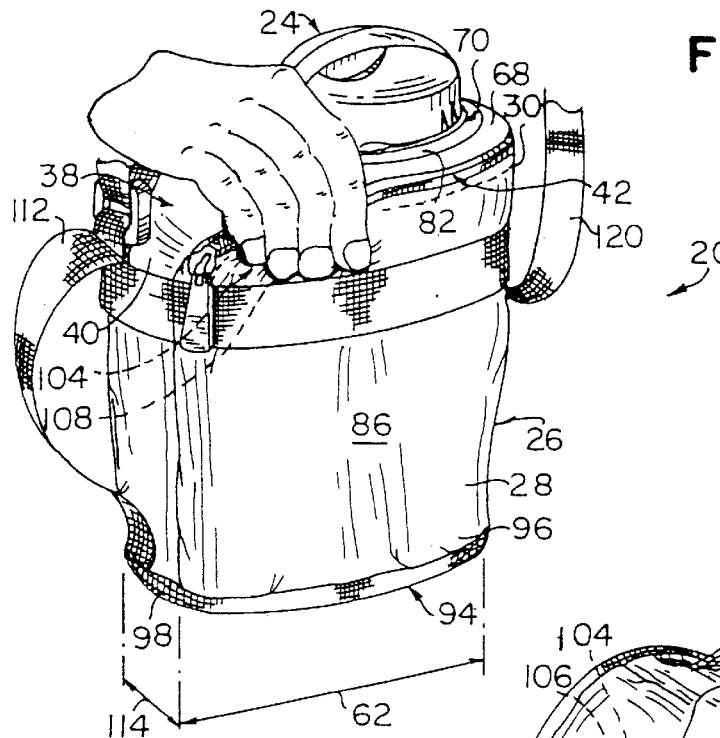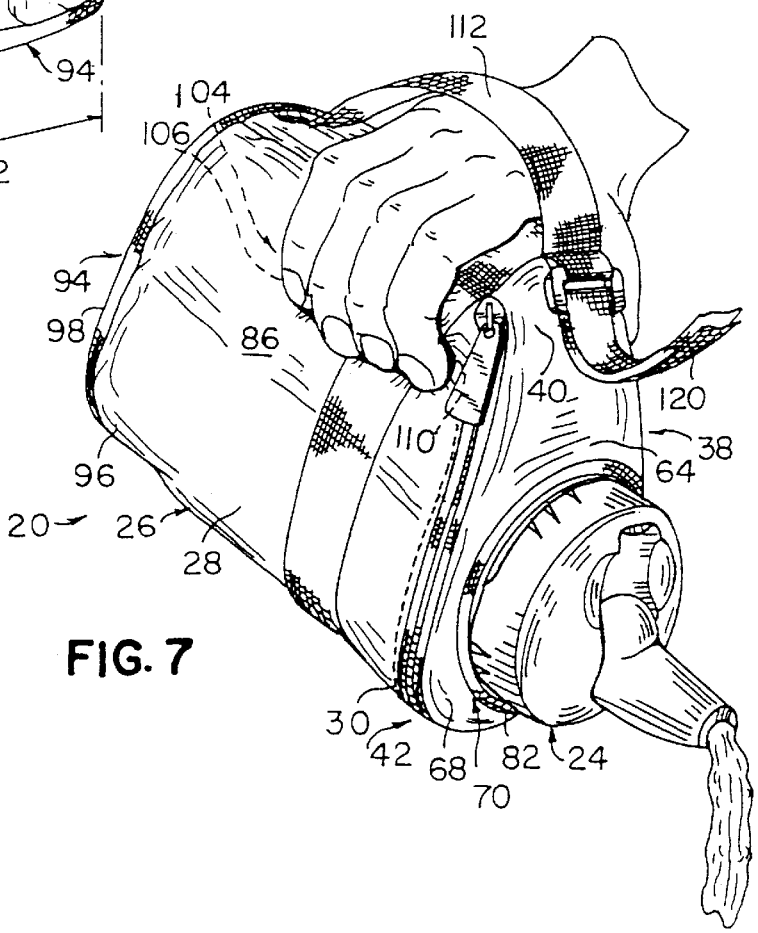

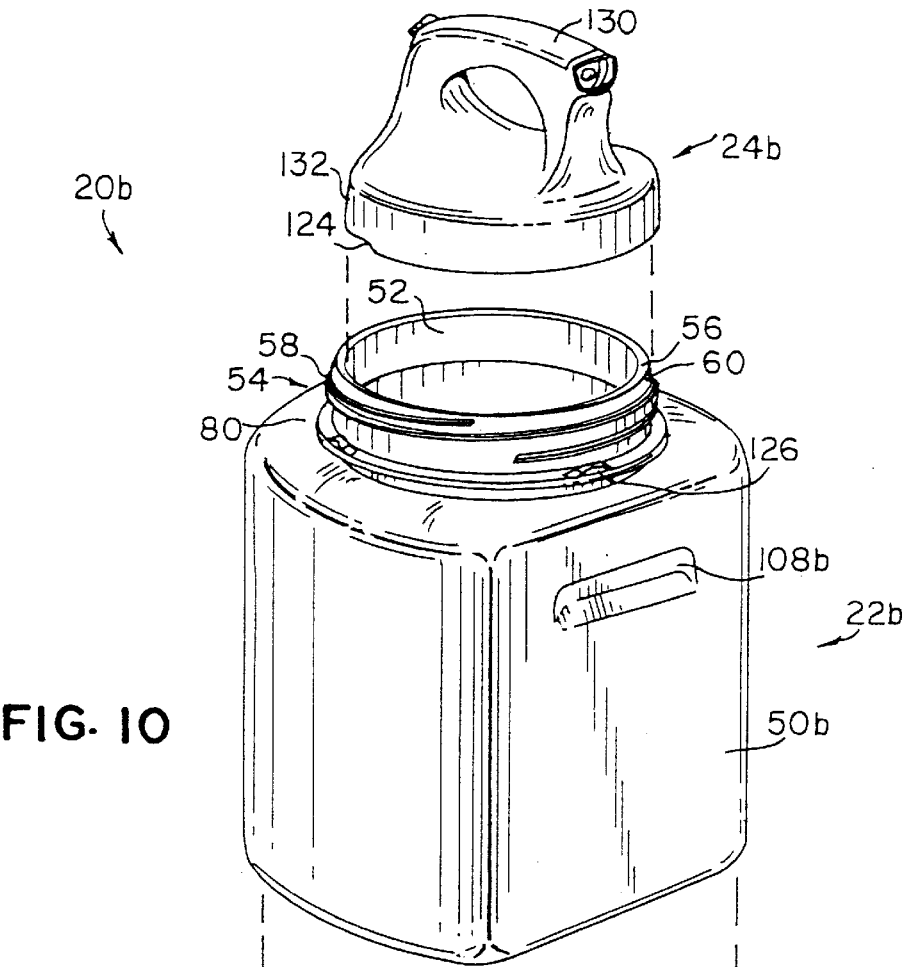
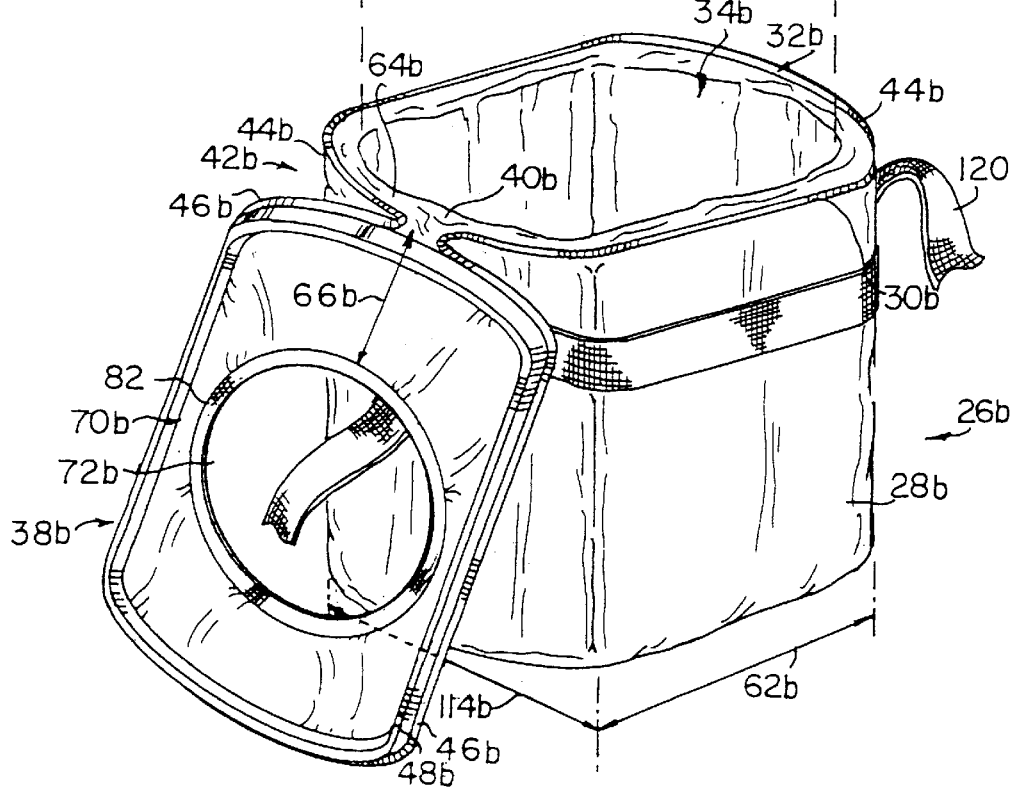
FIG. 10

INSULATED JACKET AND CONTAINER ASSEMBLY

CROSS-REFERENCE

This application is a continuation of U.S. application Ser. No. 08/801,626, filed Feb. 18, 1997, an issued as U.S. Pat. No. 5,848,734 on Dec. 15, 1998.

BACKGROUND

The present invention envisions an insulated container assembly which includes an insulated jacket surrounding a container liner.

Prior art insulated containers are generally of a rigid construction. In particular, numerous insulated containers are produced from rigid materials such as aluminum, rigid plastic, and styrofoam. One of the problems encountered with these rigid insulated containers is that they are somewhat heavy and become quite heavy, especially when they are filled with a liquid or items to be maintained in a cooled state which may include the use of ice or ice substitutes. These containers can be heavy because they are designed with a double-walled construction to provide insulating characteristics. As such, the weight of the essential container structure is doubled as the result of this double-walled construction.

The resulting filled rigid container can be quite burdensome to carry. As a result of the difficulty in transporting such rigid containers, damage may occur as a result of normal use. Damage may include dents and ruptures in the outer wall which might be lessened or eliminated if the container were not as difficult to transport.

Additionally, carrying rigid containers could be painful to the carrier or nearby persons if bumped by the container. An example might be a thermos bottle, which is a generally rigid container which could be painful if bumped against another person. Containers such as large volume liquid dispensing containers are difficult to lift and carry. One reason for difficulty is that these containers are typically round, barrel-type structures which are awkward and cumbersome to lift and carry.

As a further consideration, some prior art containers are subject to internal damage as well. For example, thermos bottles, mentioned above, are subject to internal damage in the form of breakage. It is well known that most thermos bottles include a glass vacuum chamber inside of a metal casing to provide insulating characteristics. While such an assembly is efficient at maintaining a desired temperature of the contents, such glass vacuum liners are subject to rupture and breakage as a result of impact.

Yet an additional problem associated with the prior art containers is that they are difficult to dispense from as a result of being cumbersome and do not include appropriate grips and supports for dispensing. Further, many prior art containers are not configured to provide drip-free dispensing. A commonly known liquid container includes a push-button spigot positioned in the lower portion of the container. The container is in the form of a large barrel-like structure, and the positioning of the spigot at the bottom allows for dispensing fluids therefrom under gravity induced pressure. One of the problems that occurs is that as the valve components wear or as the result of improper fit, the spigot tends to drip. This is extremely undesirable when such a container is used to dispense beverages in an indoor setting. The dripping beverages can stain floor surfaces and require clean up. Additionally, a dripping spigot can cause the contents to drip in cars and other vehicles in which such containers might be transported.

OBJECTS AND SUMMARY

An object of the present invention is to provide an insulated container assembly which includes a container liner, an insulated jacket, and a cap which allows for top loading of the container liner into the insulated jacket with the cap retained on the container liner.

Briefly, and in accordance with the foregoing, the present invention envisions an insulated container assembly which includes an insulated jacket and a container liner retained in the jacket. The container liner is formed having a body defining a mouth at an upper end thereof. A cap is retained on the container liner over the mouth. The insulated jacket has at least one wall which defines a cavity therein for receiving the container liner. A hood portion of the insulated jacket is attached to and extends from a portion of the wall. A closure structure is provided on the hood and the wall. The container liner is generally rigid and the insulated jacket is a generally flexible construction. The container liner can be loaded from the top into the cavity of the insulated jacket. The hood is extended over the cap with the cap extending through a cap opening in the hood defined by a collar thereof. The closure structure is operated to secure the hood to the wall of the insulated jacket and retain the container liner in the cavity thereof.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 4 is a partial fragmentary, cross-sectional, side elevational view taken along line 4—4 in FIG. 1 showing the structure of the insulated container assembly and the relationship of the insulated jacket and a grip portion of the container liner, showing the structure of a retainer which helps to retain a displaceable hood of the insulated jacket in a position covering the container liner, and a base rim structure which prevents tipping of the container assembly;

FIG. 6 and FIG. 7 show perspective views of the insulated container assembly of the present invention in use in which the container assembly is gripped by use of the grip portion as shown in FIGS. 2 and 4;

FIG. 10 is a top, left side, exploded, perspective view of the insulated container assembly as shown in FIGS. 8 and 9 in which a cap is removed from a container liner which is displaced from an insulated jacket;

DESCRIPTION

Figure 1:
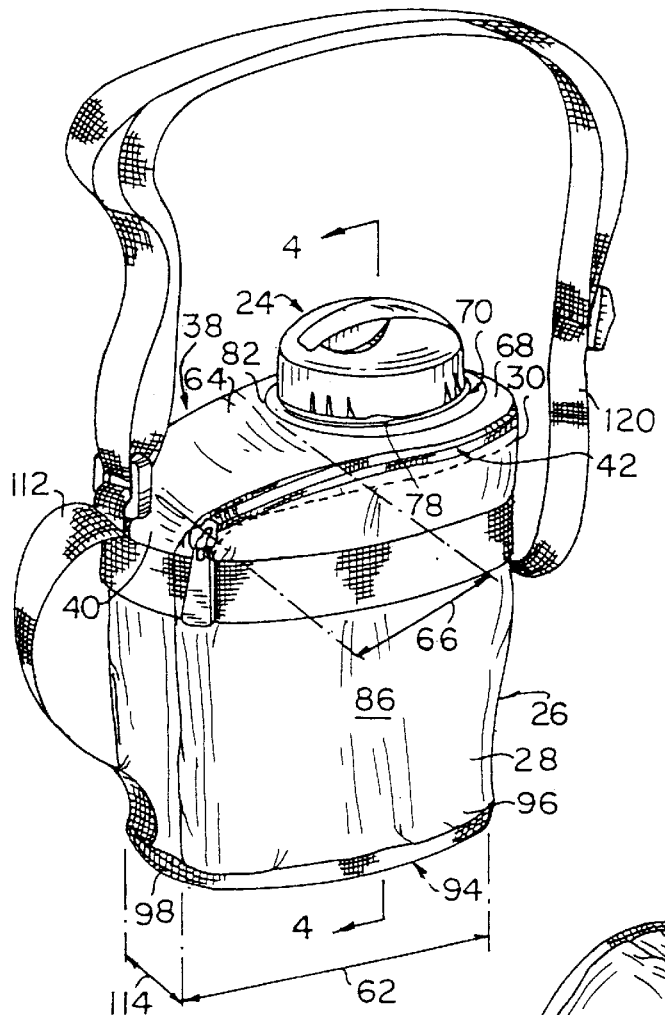
FIG. 1 is a top, left side, perspective view of an insulated container assembly of the present invention.

While the present invention may be susceptible to embodiment in different forms, there is shown in the drawings, and herein will be described in detail, three embodiments of the present invention with the understanding that the present description is to be considered an exemplification of the principles of the invention and is not intended to limit the invention to that as illustrated and described herein.

Figure 3:
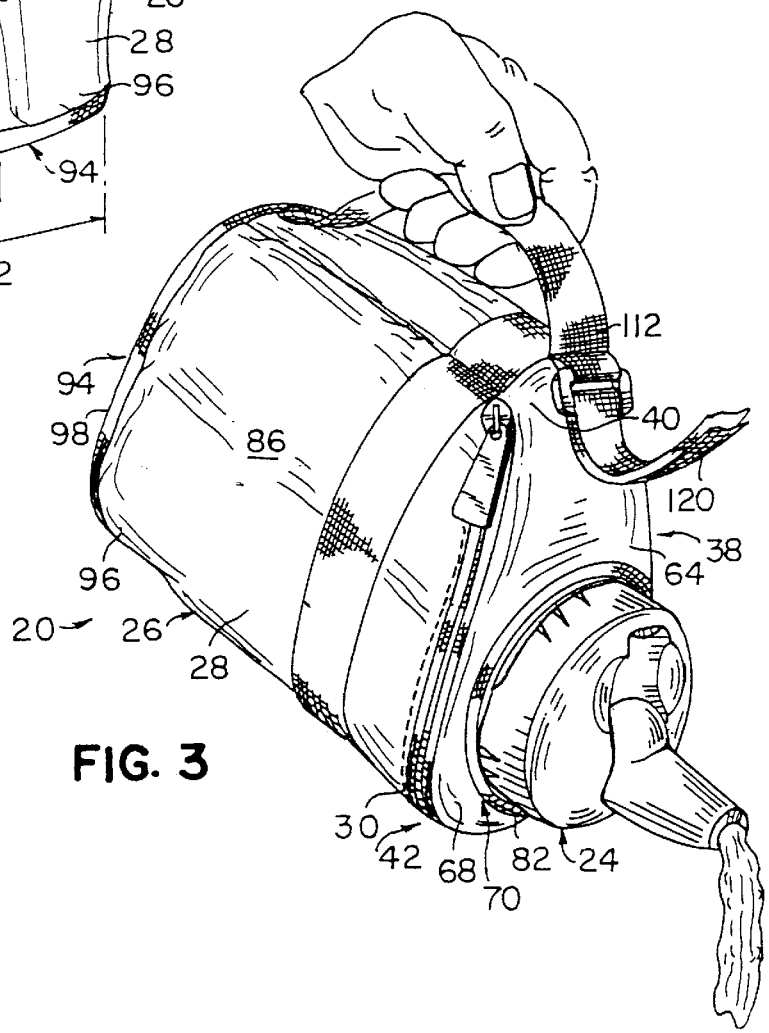
FIG. 3 is a perspective view showing the insulated container assembly as shown in FIG. 1 in use dispensing liquid therefrom.
Figure 2:
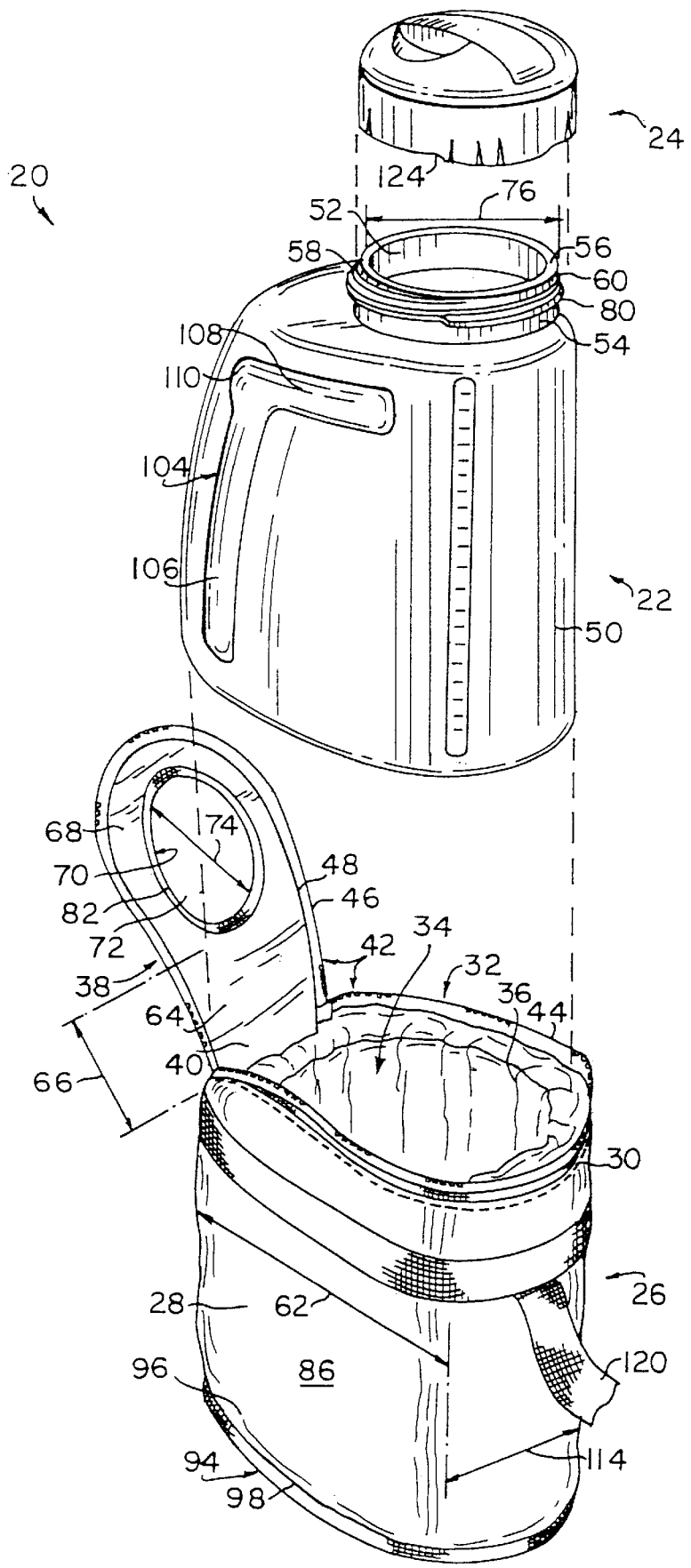
FIG. 2 is a top, right side, exploded perspective view of the insulated container assembly of the present invention showing a cap exploded from a container liner which is removed from an insulated jacket.

As shown in the figures, the present invention is directed to a novel insulated container assembly 20. The container assembly 20 of the present invention is particularly useful for containing, storing, transporting and dispensing liquids. With reference to FIGS. 1–3, the container assembly 20 of the first embodiment of the invention includes a container liner 22, a cap 24 which attaches to the container liner 22, and an insulated jacket 26. The container liner 22 is retained in the insulated jacket 26 to reduce the thermal transfer of the contents of the container liner 22.

With reference to FIGS. 1–4, 6 and 7, the insulated jacket 26 includes a wall 28 having an upper edge 30 defining a passage 32. A cavity 34 is defined by the interior surface 36 of the wall 28. The container 22 is disposed in the jacket 26 through the passage 32 and is retained in the cavity 34.

A hood 38 is attached to the wall 28 at an attachment point 40 between the hood 38 and the wall 28. The hood 38 pivots over the cavity 34 to cover the passage 32. A closure structure 42, shown as a zipper of known construction, has a first portion 44 and a second portion 46 attached to a perimeter 48 of the hood 38 and the wall 28, respectively. In the particular embodiment as shown herein, the first portion 44 of the zipper is attached to the upper edge 30 of the wall 28, although other attachment areas may be used, such as spacing the first portion 44 downwardly along the wall.

The closure structure 42 is used to releasably retain the hood 38 over the container liner 22 to retain it in the insulated jacket 26. As shown in FIG. 2, the container liner 22 is formed of a hollow body portion 50 defining a mouth 52 on an upper portion thereof. A neck 54 extends upwardly from the body portion 50 with a top edge 56 thereof defining the mouth 52. As shown throughout the drawings, the cap 24 is shown as a screw-on type cap with threads 58 provided on an outside surface 60 of the neck 54 and corresponding internal threads (not shown) being provided on a corresponding inside surface of the cap 24. It should be noted that other forms of attachment structurally may be provided between the container liner 22 and the cap 24 within the scope of the present invention. Nevertheless, the thread engaging structures are shown and described herein for purposes of describing the structure and function of the present invention.

As can be seen in FIGS. 1, 3, 6 and 7, the container assembly of the present invention is provided with a narrow profile. The narrow profile is generally defined by at least one broad side 62. By having at least one broad side 62, the present invention provides for a hinge extension portion 64 of the hood 38. The hinge extension portion 64 provides an additional distance, or offset dimension 66, which helps facilitate the pivoting of the hood 38 over a container liner 22 retained in the cavity 34. As clearly shown in FIG. 2, the hood 38 also includes a head portion 68. A collar 70 of the head portion 68 defines a cap opening 72 therein. The cap opening 72 has a dimension 74 which is approximately equal to a width dimension 76 of the neck 54. As the hood 38 is pivoted over a container liner 22, the cap 24 passes through the cap opening 72.

With further reference to the cross section as shown in FIG. 4, a retainer structure or retainer 78 is provided on the container assembly 20 to capture the collar 70 of the hood 38 in a close fit with the neck 54 of the container liner 22. The retainer 78 includes a protrusion 80 in the form of an annular ridge radially extending from the outside surface 60 of the neck 54. The retainer 78 also includes a binder portion 82 of the collar 70. The binder portion 82 is in the form of a webbing or tape extending over the lip of the cap opening 72. A ridge dimension 84 is slightly larger than the cap opening dimension 74.

A degree of flexibility or resiliency is provided in the material used for the binder 82 such that the collar 70 can be pressed over the annular ridge 80. In this manner, the retainer structure 78 helps to position the hood 38 downwardly along the neck 54. This retainer structure 78 also helps prevent the hood 38 from interfering with the attachment of the cap 24 to the neck 54. By preventing interference between the hood 38 and cap 24, there is greater assurance that a tight waterproof seal will be formed between the cap 24 and the neck 54 as it can now be tightly secured thereto.

FIG. 4 also shows the layered construction of flexible materials which are used in the insulated jacket 26. More specifically, the insulated jacket 26 includes at least one outside material layer of a durable flexible fabric material 86 such as durable nylon, an inner material layer 88, preferably of a waterproof plastic material, and an insulating foam material layer 90 sandwiched between the outer layer 86 and the inner layer 88. This construction is used in the wall 28 as well as the bottom portion 92 of the jacket 26.

Additionally, it has been found to be advantageous to provide a base rim structure 94 which is attached to a bottom perimeter 96 of the wall 28 and the bottom portion 92. A base rim structure 94 is advantageous for the flexible insulated jacket 26 of the present invention such that it prevents the insulated container assembly 20 from tipping over. The base rim structure 94 provides stability to the flexible jacket 26. In fact, the base rim structure 94, as shown in FIG. 4, is also applicable to a more axially symmetric container assembly 20a such as is shown in the second embodiment in FIG. 5.

Figure 5:
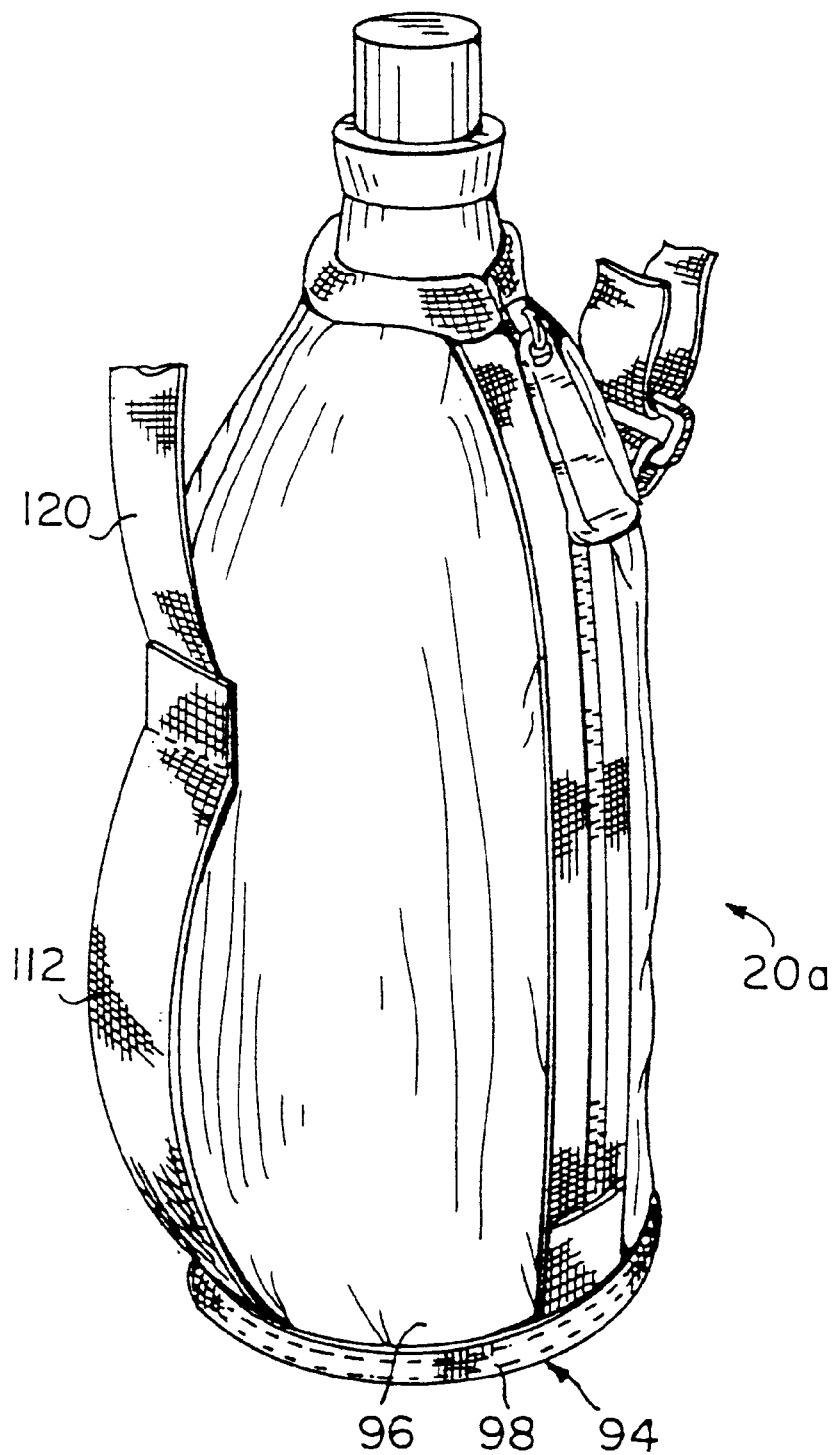
FIG. 5 is a top, left side, perspective view of a second embodiment of an insulated container assembly employing the base rim structure as shown in FIG. 4.

The base rim structure 94 as shown in FIG. 4 includes several components. A U-shaped channel 98 is attached over a joined portion 100 of the outer layer 86 and the inner layer 88 of the wall 28. An interior web 102 is attached to the channel 98. The outer material layer 86 and inner material layer 88 of the bottom 92 are attached to a portion of the interior web distal the channel 98. The multiple layers forming the base rim 94 reduce the flexibility of the otherwise generally flexible material to provide the stable support structure needed to maintain the container assembly 20 in an upright condition. Additionally, because generally flexible materials are used, sewing techniques may be used to join the materials. This adds to the efficiency and economy of the construction of the present invention. It should be noted that the same construction techniques are applied to the more axially oriented container assembly 20a as shown in FIG. 5 providing the stability needed to maintain such a container assembly 20a in an upright condition.

With reference to FIGS. 2 and 4, a grip structure 104 is provided on the outside surface of the body 50 of the container liner 22. The grip structure 104 of the present invention is provided in the form of a recessed area. The recessed area allows a user to securely grip the container assembly 20 by squeezing the flexible jacket 26 in the area of the grip 104. Because the grip 104 is recessed, a user can securely grasp the assembly through the flexible insulated jacket 26.

The grip structure 104 includes a vertical portion 106 and a horizontal portion 108. Additionally, a pivot portion 10 is provided generally between the vertical portion 106 and the horizontal portion 108. FIG. 6 shows a user's hand gripping the horizontal portion 108 by squeezing the outside surface of the insulated jacket 28 in order to grasp or otherwise engage the recessed horizontal portion 108 through the insulated jacket 26 material. The horizontal portion 108 is also useful in extracting the container liner 22 from the jacket 26. The interior surface 36 of the jacket 26 fits closely against the outside surface of the body 50. As such, the position of the horizontal portion 108 of the grip structure 104 just below the upper edge 30 of the jacket 26 allows the user to reach between the body 50 and the jacket 26 to grip the horizontal portion 108 and pull the container liner 22 out of the cavity 34 defined by the jacket 26.

The grip structure 104 is also useful when dispensing from the container assembly 20. As shown in FIGS. 3 and 7, a handle 112 is attached to the jacket 26. A user can grip the handle 112 as shown in FIG. 3 or grip the vertical portion 106 of the grip structure 104 with their hand extending through the loop of the handle 112. In both situations (FIG. 3 and FIG. 7), the container assembly 20 can be securely held and comfortably supported for dispensing.

Figure 11:
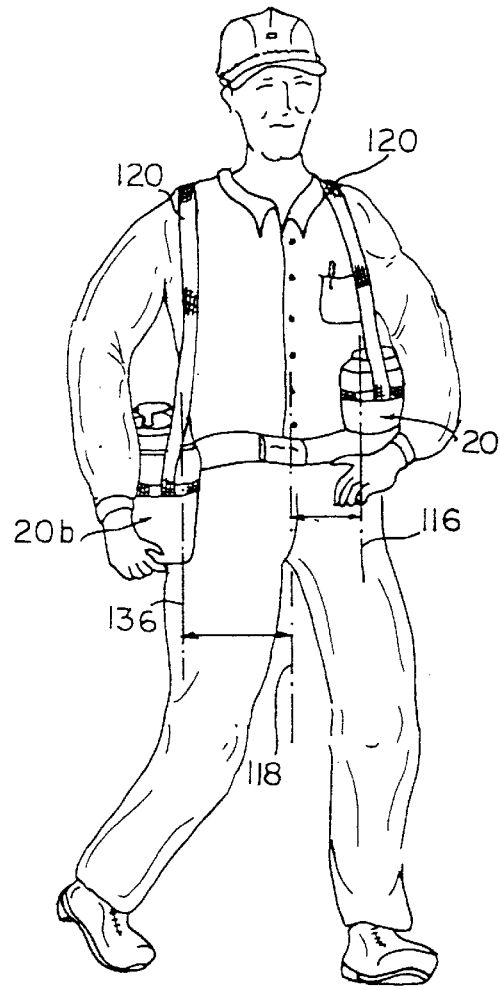
FIG. 11 is a view of a person carrying each of the insulated container assemblies as shown in FIGS. 1–4 and 6–10 to illustrate the ease of transporting such container assemblies as the result of the narrow profile of each container assembly.

In the first embodiment of the invention as shown in FIGS. 1–4, 6 and 7, the container assembly 20 has a generally narrow profile having two spaced apart broad sides 62 with narrow sides 114 therebetween. The narrow profile provides several advantages including ease of transport as the container assembly 20 may be held closely to a person carrying it. For example, FIG. 11 shows the container assembly 20 as shown in FIGS. 1–4, 6 and 7. Generally, a midpoint 116 of the container assembly 20 is positioned in close proximity to a midpoint 118 of the user. One of the problems with the prior art devices, as described hereinabove in the Background section, is that they are generally large and circular barrel structures which can be cumbersome to carry. An additional carrying strap 120 allows the container assembly 20 to be comfortably carried over a shoulder.

The narrow profile of the first embodiment as shown in FIGS. 1–4, 6 and 7 also helps to facilitate pouring such that the container hangs downwardly when the handle 112 or vertical grip portion 106 is gripped. When gripped in a hand, this narrow profile helps to stabilize the container while pouring. As such, the handle 112 is attached to one of the narrow sides 114. Additionally, the handle 112 is positioned on the narrow side 114 opposite the cap 24.

Figure 12:
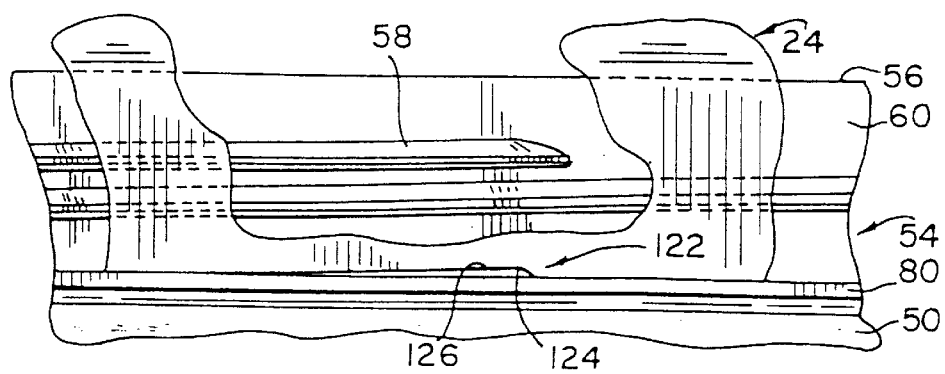
FIG. 12 is an enlarged, partial fragmentary, side elevational view of a retainer and positioning assembly of the present invention.

An additional structure of the present invention is a positioning structure 122 on the container liner 22 and the cap 24. The positioning structure which includes a recess 124 and a ramp 126. These elements (124,126) are shown in FIG. 12. The positioning structure 122 helps to position the cap 24 in a desired orientation relative to the container liner 22. Additionally, the threads 58 on the neck 54 and the cap 24 have been configured to initially promote the desired orientation of the cap 24 relative to the liner 22. However, even though the thread configuration which promotes a desired position of one body relative to another is well known, such thread configuration is not foolproof. As such, the recess 124 and ramp 126, as shown in FIG. 12, have been provided on the present invention. The positioning structure 122 helps to assure that the desired orientation is guaranteed and that overtightening is prevented. Overtightening could damage the threads as well as misalign the cap 24 relative to the container.

Figure 9:
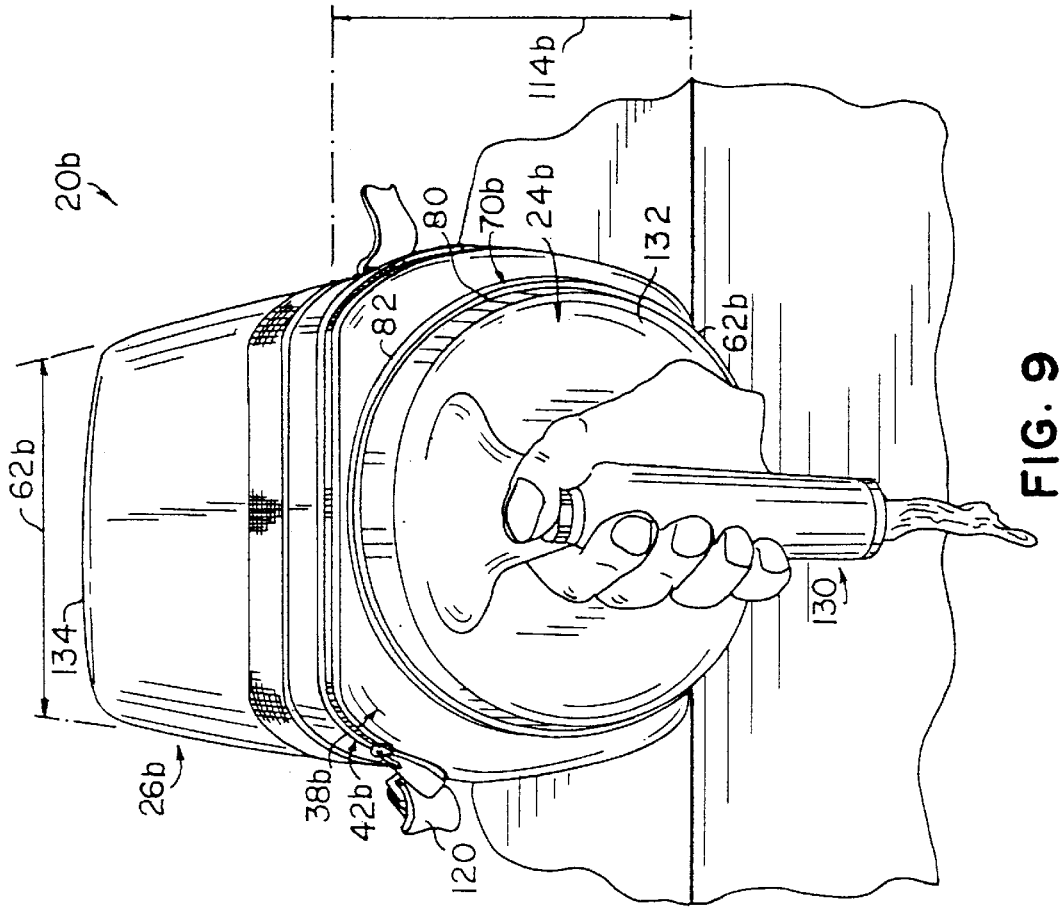
FIG. 9 is a perspective view of the insulated container assembly as shown in FIG. 8 which has been tipped on a large flat side to facilitate dispensing.
Figure 8:
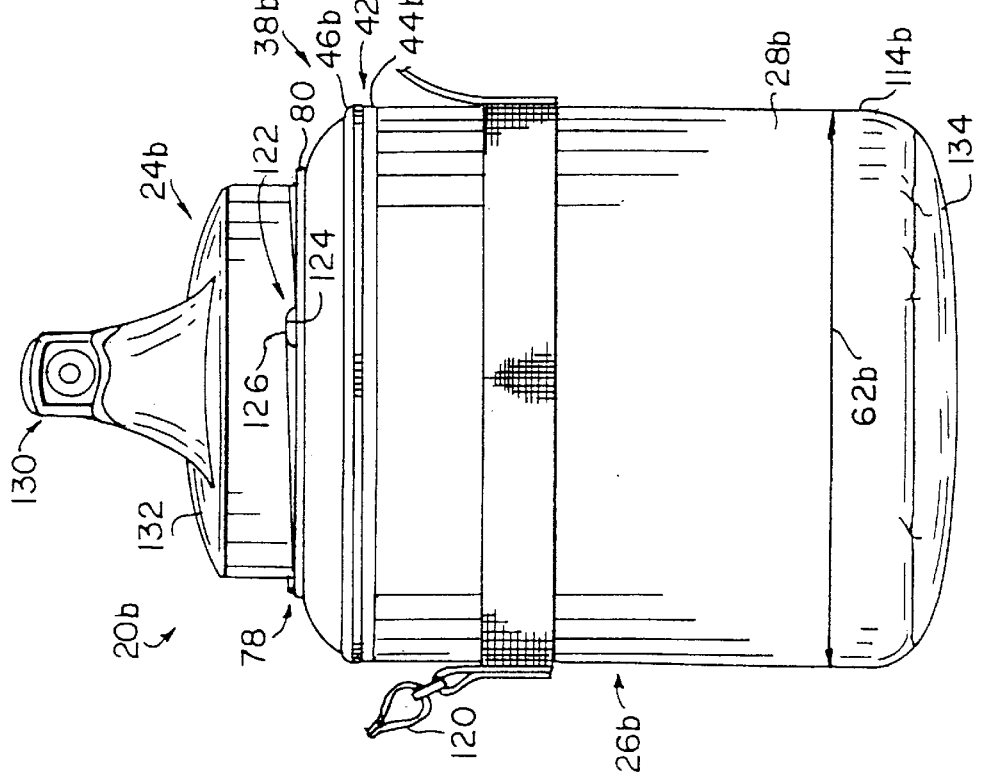
FIG. 8 is a third embodiment of the insulated container assembly in accordance with the teachings of the present invention and which overcomes problems associated with liquid dispensing containers.

Turning now to a third embodiment of the present invention, as shown in FIGS. 8–11, further reference will be made to this embodiment using the same reference numerals as used hereinabove to identify the same element followed by an alphabetic suffix to indicate the second embodiment. For example, the insulated container assembly is referred to herein as 20b because 20a has already been applied to the second embodiment as shown in FIG. 5. As such, the suffix "b" will be used throughout the description referring to the third embodiment. With reference to FIGS. 8–10, the third embodiment shows the insulated container assembly 20b having container liner 22b which fits into an insulated jacket 26b. A cap 24b attaches to the liner container 22b. As described hereinabove, the jacket 26b includes the hood 38 which is attached at an attachment point 40b to a wall 28b of the sleeve 26b. The hood 38b extends over the cavity 34b defined by the wall 28b. An upper edge 30b of the wall 28b defines the passage 32b through which the liner container 22b is inserted.

The hood 38b includes a collar 70b defining a cap opening 72b. A hinge extension portion 64b provides an offset 66b which positions the collar 70b away from the wall 28b of the jacket 26b. As such, the hood 38b can be positioned over the top of a liner container 22b having a cap 24b attached thereto. The additional offset dimension 66b helps to extend the collar 70b over the top of the cap 24b. Once the hood 38b is positioned over the passage 32b, the closure structure 42b is operated to retain the hood 38b in engagement with the wall 28b. The closure structure 42b is shown in the form of a zipper of known construction having a first portion 44b attached to the upper edge 30 of the wall 28b and a second portion 46b attached to the perimeter 48b of the hood 38b.

The retainer 78 as used in the embodiment as shown in FIGS. 8–10 is the same retainer 78 as used in the first embodiment as shown in FIGS. 1–3 and described hereinabove. In this regard, reference is made to the upper portion of FIG. 4 to show the structure and function of the retainer 78. As can be seen in FIGS. 8 and 10, an annular ridge 80 is positioned on a neck 54 of the container liner 22b. The neck 54 extends upwardly from the body 50b of the container liner 22b. With reference to FIG. 4, the retainer 78 includes a top binding 82 attached to the edge of the collar 70b. Although the cap 24 as shown in FIG. 4 is different from the cap 24b as shown in FIGS. 8–10, the general relative relationship between the ridge diameter 84 and the cap opening diameter 74 is maintained in the embodiment as shown in FIGS. 8–10. When the hood 38b as shown in FIG. 10 is positioned over the liner container 22b and cap 24b, the top binding 82 of the collar 70b is distorted somewhat to fit over the annular ridge 80. Once the collar 70b is in proper position, it is retained underneath the annular ridge 80. The structure described hereinabove with regard to FIG. 12 including the positioning structures 122 are also employed on the embodiment as shown in FIGS. 8–10. This helps to make sure that the cap 24b is positioned in a proper orientation. Reference is made to the description of the positioning structure 122 provided hereinabove.

Additionally, a horizontal grip structure 108b in the form of a recess is provided on opposite sides of the body of the liner container 22b. The horizontal grip 108b allows the user to grip the liner container 22b at the sides to extract it from the cavity 34b of the jacket 26b.

Another advantage of the second embodiment of the invention as shown in FIGS. 8–10 is that it has a narrow profile defined by at least one broad side 62b and at least one narrow side 114. The broad side 62b is necessary because the second embodiment includes a cap 24b which also has a spigot housing 130. The spigot housing 130 controllably dispenses liquids from the container liner. Also, the spigot housing 130 has a portion which is spaced away from a lid portion 132 of the cap which allows a user to grasp the spigot housing 130 in a handle-like manner. The spigot housing 130 as shown in the figures could also be in the form of a less complicated spigot of generally known construction. One of the key features of this embodiment, however, is that the spigot is attached to the cap 24 in an orientation which prevents dispensing when the container is in an upright position. This embodiment requires tipping of the container assembly 20b onto a corresponding broad side 62 to facilitate dispensing from the container. The structure of the container assembly 20b which requires and facilitates tipping of the container on its side in order to dispense assures that there will be no dripping from the spigot when the container is returned to the upright or "righted" position.

In this regard, once liquid is dispensed from the container assembly, the container can be pivoted or positioned in the upright position as shown in FIG. 8. In the upright position, there will be no hydrostatic force or head on the spigot, and therefore, dripping will be prevented. In the downwardly positioned or tipped position as shown in FIG. 9, a hydrostatic force develops behind the spigot to promote gravity flow of liquid from the container assembly 20b.

In order to further facilitate tipping of the container assembly, a partially arcuate or rounded bottom 134 is provided on the base of the container assembly 20b. While the bottom is not substantially rounded or arcuate, there is a curve to the bottom which promotes tipping. The arcuate curve on the bottom 134 is sufficient to promote tipping but has a large enough radius to prevent tipping when the container is unattended in the righted position. In this regard, a manual force is required in order to tip the container over onto the broadside 62 for dispensing.

Yet a further advantage of the device as shown in FIGS. 8–10 and further in FIG. 11 is that it has a narrow profile which helps to promote ease of transport. The narrow profile allows a user to carry the container assembly over their shoulder while maintaining it close to their midpoint. This is because the narrow design results in a midpoint of the container 136 which can be closely positioned to an individual's midpoint 118.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. An insulated container assembly including an insulated jacket and a container retained in said jacket; a cap retained on said container; said insulated jacket having a bottom and at least one wall defining a cavity, said wall defining a passage; a displaceable hood attached to said wall having a perimeter generally corresponding to said passage, said hood having an opening for receiving therethrough said cap retained on said container; a handle attached to said insulated jacket such that when said handle is placed over a shoulder of a user, said cap retained on said container points generally upward; a closure structure attached to said hood and to said at least one wall for retaining said hood over said passage and for releasably securing said hood to said wall such that said hood is generally opposite said bottom of said jacket; whereby said hood is displaceable from said wall for removal from said container and for removal of said container from said cavity, said container being positioned in said cavity through said passage with said hood overlying said container and said cap being received in said opening in said hood.

2. An insulated container assembly as recited in claim 1, further comprising a collar fully surrounding a perimeter of said opening in said hood.

3. An insulated container assembly as recited in claim 1, further comprising a second handle attached to said insulated jacket such that when said handle is held, said cap of said container points in a direction which is substantially parallel to the ground thereby facilitating dispensing of contents of said container.

4. An insulated container assembly as recited in claim 1, said hood including a hinge extension portion which provides an offset dimension which facilitates pivoting of said hood.

5. An insulated container assembly as recited in claim 1, further comprising retaining structure on a circumferential portion of said opening in said hood.

6. An insulated container assembly as recited in claim 1, said container further including a neck extending from said container and wherein said cap is configured for screwing onto said neck of said container.

7. An insulated container assembly as recited in claim 6, further comprising positioning structure on said cap and said neck of said container, said positioning structure positioning said cap in a desired orientation relative to said container.

8. An insulated container assembly as recited in claim 7, said positioning structure comprising a recess and a ramp.

9. An insulated container assembly as recited in claim 6, further comprising retaining structure on a circumferential portion of said opening in said hood.

10. An insulated container assembly as recited in claim 9, said retaining structure comprising a binder portion of said collar and a protrusion on said neck of said container.

11. An insulated container assembly as recited in claim 1, further comprising grip structure on said body of said container.

12. An insulated container assembly as recited in claim 11, said grip structure comprising a recessed area which is configured to allow a user to securely grip the container through said insulated jacket.

13. An insulated container assembly as recited in claim 12, said recessed area including a generally vertical portion.

14. An insulated jacket for covering at least a portion of a container, said jacket having a bottom and at least one wall defining a cavity, said wall having an upper edge defining a passage generally opposite said bottom of said jacket; a displaceable hood attached to said wall, said hood having a perimeter generally corresponding to said passage, said hood having an opening for receiving therethrough a neck of the container such that said hood is retained under a protrusion on the neck of the container, said hood including a head portion adjacent one side of said opening and including a hinge extension portion adjacent an opposite side of said opening, said opposite side of said opening being between said opening and a point at which said hood is attached to said wall; said hood being displaceable from said wall for removal from the container and for removal of the container from said cavity, said jacket being configured such that the container can be positioned in said cavity through said passage with said hood overlying the container and the neck of the container being received in said opening in said hood with said hood being retained under the protrusion on the neck of the container.

15. An insulated jacket as recited in claim 14, further comprising a collar fully surrounding a perimeter of said opening in said hood, said collar being retained under the protrusion on the neck of the container when said hood overlies the container.

16. An insulated jacket as recited in claim 14, said hood of said jacket including a hinge extension portion providing an offset dimension which facilitates pivoting of said hood.

17. An insulated jacket as recited in claim 15, further comprising retaining structure between said opening in said hood and the neck of the container for capturing said collar of said hood in a generally close fit with the neck of the container.

18. An insulated jacket as recited in claim 17, said retaining structure comprising a binder portion of said collar for engaging the protrusion on the neck of the container.

19. An insulated jacket as recited in claim 14, further comprising a base rim structure attached to a bottom perimeter of said wall, said base rim structure stabilizing said insulated jacket in a generally upright position; said jacket configured such that the container can be gripped through the jacket.

20. A method of retaining a container in an insulated jacket, said method comprising: opening closure structure on said jacket thereby releasing a hood so that said hood can thereafter be displaced, said closure structure adjacent said hood, and said hood attached to a wall of said jacket, said wall having a perimeter generally corresponding to a passage into said jacket; displacing said hood thereby exposing said passage into said jacket; inserting at least a portion of said container into said passage into said jacket; replacing said hood over said container such that said hood becomes positioned generally opposite a bottom of said jacket, such that an opening in said hood of said jacket receives a cap retained on a neck of said container, and such that a collar which at least partially surrounds said opening in said hood becomes retained below a protrusion on said neck of said container; and closing said closure structure thereby securing said hood over said container.

* * * * *